July 13, 1937.  F. L. SCOTT ET AL  2,086,680

DRILL CUTTER MOUNTING

Filed Sept. 8, 1934

Floyd L. Scott and Lewis E. Garfield, INVENTORS.

BY Jesse R. Stone

ATTORNEY.

Patented July 13, 1937

2,086,680

UNITED STATES PATENT OFFICE 2,086,680

DRILL CUTTER MOUNTING

Floyd L. Scott and Lewis E. Garfield, Houston, Tex., assignors to Hughes Tool Company, Houston, Tex., a corporation of Texas Application September 8, 1934, Serial No. 743,238

12 Claims. (Cl. 255—73)

Our invention relates to a means for mounting cutters on the head of a well drill, a reamer or the like.

It is an object of the invention to provide a cutter bearing so constructed and supported as to be readily assembled and mounted in operative position.

It is a further object to provide a support for the cutter shaft which may be renewed when worn and thus remedy the rapid wear which takes place about the lower end of the drill head in some formations.

It is another object to provide a support which may be adjusted when necessary to take up wear in use.

We also desire to provide an improved bearing for the cutter which bearing is capable of easy assembly.

Other features of value in the invention will more clearly appear from the drawing herewith upon which:

Figure 1:
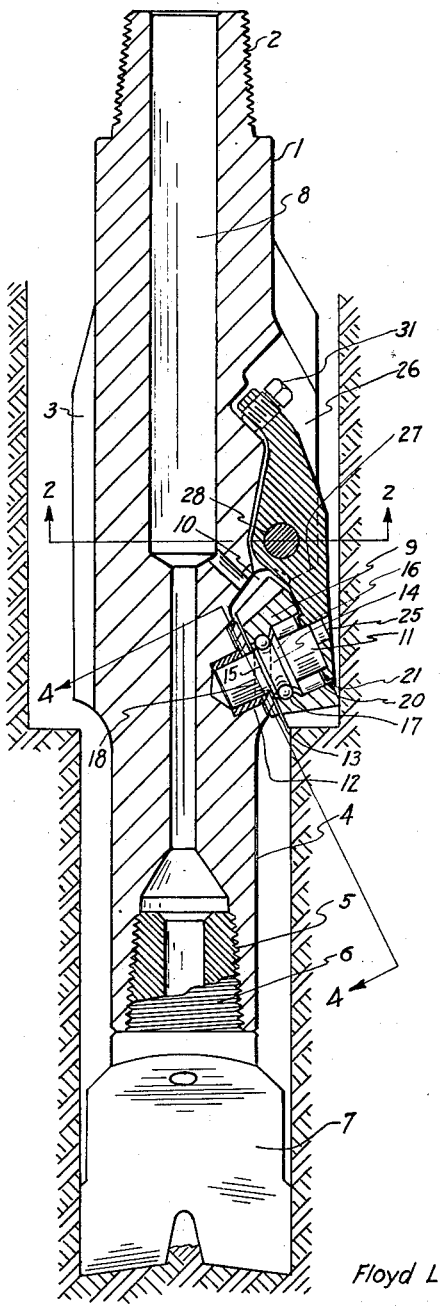
Fig. 1 is a central longitudinal sectional view through a well drill embodying the invention.
Figure 2:
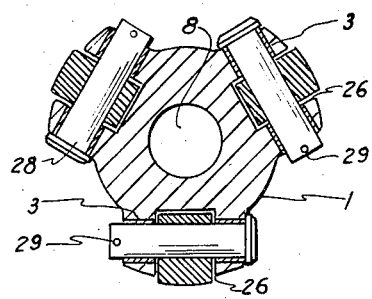
Fig. 2 is a transverse section on the plane 2—2 of Fig. 1.
Figure 3:
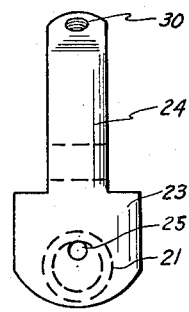
Fig. 3 is a side elevation of the shaft support removed from the drill head.

We have illustrated the invention as applied to a multistage well drill of common construction. There is a head 1 having an upper threaded shank 2 for connection with a drill collar or coupling. Said head is formed with a plurality of longitudinal ribs or ridges 3 thereon which, as will be described, are recessed to support the cutters. We have shown three such ridges.

The lower portion 4 of the head is reduced somewhat in outer diameter and has a tapered socket 5 threaded to receive the shank 6 of a fishtail bit 7, or any other desired type of bit. The head has an axial passage 8 therethrough for the flushing fluid.

The cutters 9, whose mounting forms the subject matter of our invention, are housed in upwardly and inwardly inclined slots or pockets 10 extending from the lower shoulders of the ridges 3 upwardly. Said cutters are thus positioned to cut the wall of the hole in such manner as to enlarge the bore cut by the forward bit 7. Said cutters are of frusto-conical shape, tapered inwardly and toothed longitudinally.

Figure 4:
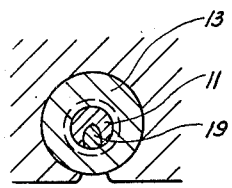
Fig. 4 is a broken section on the plane 4—4 of Fig. 1, illustrating the inner shaft support.

Each cutter is mounted upon a bearing shaft 11 set transversely of the pocket 10 and is supported at both ends. The inner support is formed by a ferrule or collar 12 set within a cylindrical recess in the inner side wall of the pocket. The wall is formed with a shallow recess of larger diameter about the shaft recess to receive a washer 13 mounted eccentrically upon the shaft. As will be seen from Fig. 4 the recess for the washer is not entirely closed on its lower side.

The cutter shaft is formed with a ball race at 14 toward the inner end of the cutter bearing. This race has a slight ridge bounding it on its inner side at 15 and a ridge 16 on its outer margin. The cutter also is grooved to provide a race to receive the balls 17 which by fitting in grooves partly in the shaft and partly in the cutter hold said cutter from longitudinal movement on the said shaft. The balls are inserted into said raceway, after the cutter is mounted thereon, through a bore or opening diagonally through the pin as will be seen in dotted lines at 18. When the balls have been inserted the bore is filled by a steel plug 19 welded in place. There is a row of cylindrical roller bearings 20 on the shaft adjacent the outer wall of the pocket.

The outer end of the cutter shaft is supported in a recess in the inner face of the plate 23 formed upon a rocker arm 24 set in the head of the drill. An eccentric projection 25 on said shaft extends into an opening through the plate.

The ridge 3 has a central vertical slot or groove 26 in which the rocker arm 24 is mounted. The plate 23 on said arm is of the full width of the rib or ridge 3 and fits below an inclined shoulder on the ridge indicated at 27 in dotted lines. The arm is supported upon a pivot pin 28 extending transversely of the groove 26 and held in position by a dowel pin 29 or other similar means.

The upper end of the rocker arm is curved inwardly and has a threaded opening 30 therein to receive a set screw 31, the inner end of which is adapted to contact with a shoulder on the inner wall of the groove 26. It will be seen that the tightening of the set screw 31 will move the upper end of the arm 24 outwardly and tighten the plate 23 upon the arm inwardly against the cutter shaft. There is a slight ridge on the inner face of the arm about the shaft at 32, which engages slightly within the end of the cutter to prevent loss of the cutter if the shaft should break.

In assembling the cutters upon the head each cutter will be mounted on its shaft and the row of locking balls 17 will be inserted and the bore 18 stopped by its plug. The shaft will then be inserted into the pocket from the outer side with the end of the shaft in the recess or ring 12. The rocker arm will then be secured in place with the eccentric projection 25 on the cutter shaft fitting with the opening in the head of the rocker arm. The set screw 31 may then be tightened to hold the shaft securely against longitudinal movement.

It is to be noted that when cutters are changed, the shafts or the rocker arms or both of them may be also easily renewed. By removing the rocker arm, the cutter-receiving pocket is open on its outer side so that easy access to the cutter and shaft is possible. Further, if wear upon the cutter or the shaft should occur the tightening of the set screw will tend to retain the cutter against rattling or wobbling until it is worn out.

What we claim as new is:

1. In a well drill, a drill head, pockets in the sides of said head, a shaft extending transversely in each of said pockets, a plate forming the outer wall of each of said pockets and acting to support the end of a shaft, means to support said plate for adjustment toward and away from said pocket, shoulders on said plate at its upper end adapted to engage said head when said plate is adjusted inwardly into supporting position beneath said head, and cutters on said shafts in said pockets.

2. In a well drill, a head, a pocket therein, shoulders above said pocket, a radially movable plate forming the outer wall of said pocket, a cutter shaft extending transversely across said pocket and supported at its outer end in said plate, means on said plate engaging said shoulders to resist upward movement of said plate, and a cutter on said shaft.

3. In a well drill, a head, a pocket therein, a shaft therein extending transversely thereof, a cutter on said shaft, a row of balls adapted to roll in a raceway partly in said cutter and partly in said shaft to secure said cutters against movement longitudinally of said shaft, said balls being introduced to said raceway through a bore in said shaft when said cutter is in place thereon and removable means movable longitudinally relative to said shaft to support the outer end of said shaft.

4. In a well drill, a head, an upwardly extending cutter pocket therein, a shaft in said pocket disposed transversely thereof, said shaft being supported at its inner end in a recess in the side wall of said pocket, an arm mounted in said head closing the outer side of said pocket, a support in said arm for the outer end of said shaft, said arm being laterally adjustable to tighten against said shaft, and a cutter in said pocket upon said shaft.

5. In a well drill, a head, an upwardly extending cutter pocket therein, a shaft in said pocket disposed transversely thereof, said shaft being supported at its inner end in a recess in the side wall of said pocket, an arm mounted in said head closing the outer side of said pocket, a support in said arm for the outer end of said shaft, said arm being laterally adjustable to tighten against said shaft, an annular ridge on said arm to engage within a cutter, and a cutter in said pocket upon said shaft.

6. In a well drill, a head, cutter pockets in said head, cutters in said pockets, cutter shafts transversely of said pockets, said shafts being supported at one of their ends in the inner walls of said pockets, arms pivoted on said head, a plate on each of said arms closing one side of each of said pockets, and supports in said plates for the outer ends of said shafts.

7. In a well drill, a head having a plurality of radial ridges thereon, cutter pockets inclined upwardly and inwardly in said ridges adjacent their lower ends, cutter shafts in said pockets transversely thereof, said shafts being supported at their inner ends in recesses in said head, arms pivoted on the head in grooves in the outer faces of said ridges, supports in the ends of said arms for said shafts, and cutters on said shafts.

8. In a well drill, a head having a plurality of radial ridges thereon, cutter pockets inclined upwardly and inwardly in said ridges adjacent their lower ends, cutter shafts in said pockets transversely thereof, said shafts being supported at their inner ends in recesses in said head, arms pivoted on the head in grooves in the outer faces of said ridges, a supporting plate at the lower end of each of said arms, non-rotatable supports in said arm plates for said cutter shafts and cutters on said shafts.

9. In a well drill, a head, a plurality of upwardly and inwardly inclined pockets in said head, cutter shafts in said pockets transversely thereof, supports for the inner ends of said shafts in the inner walls of said pockets, arms set in longitudinal grooves in the outer periphery of said head, pivot pins upon which said arms are rockably mounted, a support in one of the ends of each of said arms to retain the outer end of a shaft and cutters on said shafts.

10. In a well drill, a head, a plurality of upwardly and inwardly inclined pockets in said head, cutter shafts in said pockets, transversely thereof, supports for the inner ends of said shafts in the inner walls of said pockets, arms set in longitudinal grooves in the outer periphery of said head, pivot pins upon which said arms are rockably mounted, a support in one of the ends of each of said arms to retain the outer end of a shaft, means in the other end of each of said arms adapted to engage the head and adjustable to force and hold said support firmly against said shaft and cutters on said shafts.

11. In a well drill, a head, a pocket therein, a laterally adjustable plate forming the outer wall of said pocket, a cutter shaft extending transversely across said pocket and supported at its outer end in said plate, a cutter on said shaft, and a row of balls interfitting between said shaft and said cutter to prevent longitudinal movement of said cutter on said shaft.

12. In a well drill, a head, an upwardly inclined pocket therein, a shaft transversely of said pocket, supports for both ends of said shaft in the walls of said pocket, a cutter on said shaft, a row of balls interfitting between said cutter and shaft, and means whereby said balls may be inserted into position while said cutter is on said shaft, and before said shaft is mounted in said head.

FLOYD L. SCOTT.
LEWIS E. GARFIELD.